United States Patent [19]
Nozawa

[11] 3,803,935
[45] Apr. 16, 1974

[54] ANTI-BACKLASH GEARING SYSTEM
[75] Inventor: Kouji Nozawa, Tokyo, Japan
[73] Assignee: Nissan Motor Company, Limited, Kanagawa-ku, Yokohama City, Japan
[22] Filed: Aug. 15, 1972
[21] Appl. No.: 280,759

[30] Foreign Application Priority Data
Oct. 7, 1971 Japan.............................. 46-78379

[52] U.S. Cl. ............................................... 74/409
[51] Int. Cl............................................. F16h 55/18
[58] Field of Search............................ 74/440, 409

[56] References Cited
UNITED STATES PATENTS

| | | | |
|---|---|---|---|
| 3,496,794 | 2/1970 | Forichon.............................. | 74/440 |
| 1,604,105 | 10/1926 | Starkey................................ | 74/440 |
| 1,748,820 | 2/1930 | Alexandrescu ...................... | 74/440 |
| 1,619,799 | 3/1927 | Rounds et al........................ | 74/440 |
| 2,607,238 | 8/1952 | English et al. ...................... | 74/440 |

Primary Examiner—Leonard H. Gerin

[57] ABSTRACT

An anti-backlash gearing system consisting of a main drive gear having at least two radially extending guide slots, an auxiliary gear element which is identical with the main drive gear in outer diameter and the number of gear teeth and which is rotatable with respect to the main drive gear, the auxiliary gear element having a hub member which extends from one side of the auxiliary gear element and which is formed on its outer periphery with at least two concave portions, at least two weight members each having a sliding portion slidably received in each of the guide slots of the main drive gear and having a projection engaging with each of the concave portions formed on the hub member, and at least two biasing means each disposed in each of the guide slots of the main drive gear for biasing each of the weight members radially inwardly to cause each of the projections of the weight members to engage with each of the concave portions formed on the hub member.

4 Claims, 3 Drawing Figures

PATENTED APR 16 1974      3,803,935

ANTI-BACKLASH GEARING SYSTEM

The present invention relates in general to a gearing system and, more particularly, to a gearing system capable of eliminating backlash to prevent objectionable noises and minimizing power losses while effecting smooth engagement between mating gears.

A presently known system for eliminating backlash in gear trains usually includes spring-loaded so-called scissor spur gears. Such a scissor spur gear may be considered as being a single spur gear transversely sliced in two to form a pair of gears rotating about a common axis. Spring means are interposed between the two gears and so arranged as to supply a restoring torque when the two gears are relatively angularly displaced. In use such angular displacement is effected and the scissor gear having teeth of width such as to engage both sets of teeth on the scissor gear.

With this known arrangement, the scissor spur gear is subject to excessive wear and power loss due to the constantly spring-loaded teeth irrespective of rotational speeds of the spur gear. When the spur gear is rotating at a high speed, there is no objectionable noises between gears and, thus, it is desirable to provide a backlash with a view to eliminating power loss in the event the spur gear is rotating at high speed.

It is, therefore, an object of the present invention to provide an improved anti-backlash gearing system which is not subject to excessive wear.

Another object of the present invention is to provide an improved anti-backlash gearing system which is capable of eliminating power losses.

A still another object of the present invention is to provide an improved anti-backlash gearing system which is capable of eliminating objectionable noises between gear changes.

A further object of the present invention is to provide an improved anti-backlash gearing system which is adapted to retain a zero backlash at low speed of the mating gears and to permit free rotation of the scissor gear to eliminate power losses between the mating gears at high speeds of the mating gears.

In general, these objects of the present invention can be achieved by an anti-backlash gearing system having a main drive gear which is integral with or fixed to a rotatable shaft and which is provided with at least two radially extending guide slots. An auxiliary gear element is coaxial with and mounted on the rotatable shaft adjacent the main gear and has teeth similar to and meshing with the gear teeth of the main drive gear. The auxiliary gear element also has a hub member which is slidably disposed on the rotatable shaft and which is formed with at least two concave portions. Weight members are disposed between the radially extending guide slots and the concave portions formed on the auxiliary gear element, respectively, and are biased by spring means radially inwardly. Each of the weight members has a projection which engages with the concave portion of the auxiliary gear element, the arrangement being such that the projection of the weight member is prevented from completely engaging with the concave portion formed on the hub member of the auxiliary gear element to retain zero backlash until the rotational speed of the rotatable shaft reaches a predetermined level. When the rotational speed of the rotatable shaft reaches the predetermined level, the weight members are moved radially outwardly by the centrifugal force exerted thereon so that the projection of respective weight members disengage from the corresponding concave portions formed on the hub member of the auxiliary gear element whereby the auxiliary gear element is made free to rotate in respect to the main drive gear.

These and other objects, features and advantages of the present invention will become more apparent from the following description when taken in conjunction with the accompanying drawings, in which.

Figures 1, 2:
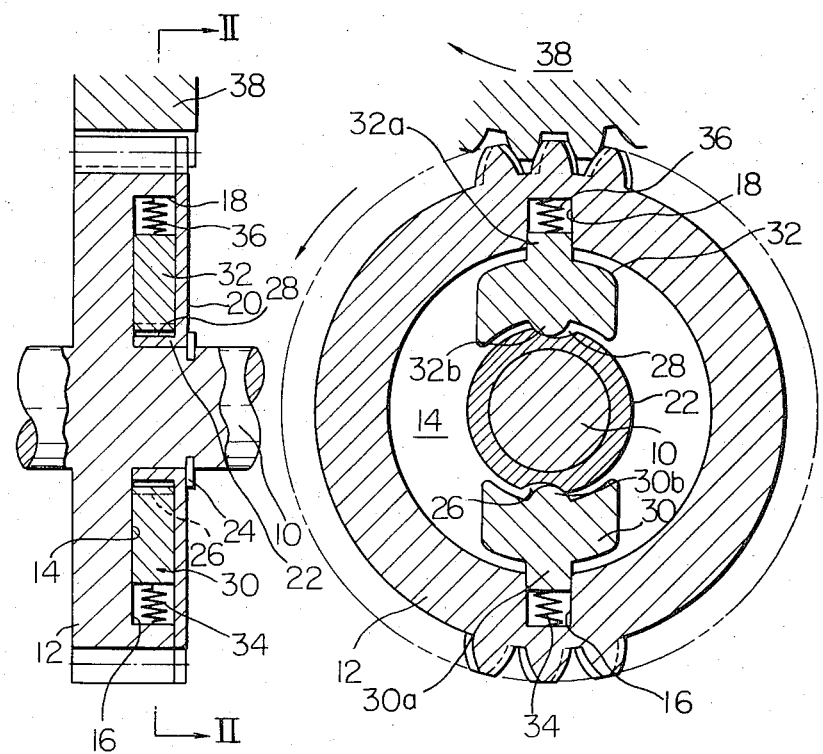
FIG. 1 is a longitudinal sectional view of a preferred embodiment of the anti-backlash gearing system according to the present invention.
FIG. 2 is a sectional view taken on line II—II of FIG. 1.

Referring now to FIGS. 1 and 2, there is shown a preferred embodiment of the anti-backlash gearing system implementing the present invention. The gearing system of the present invention includes a rotatable shaft 10, to which a main drive gear 12 is fixed to be rotatable therewith. As shown, the main drive gear 12 has formed at one side thereof with a circular hollow portion 14 and at least two guide slots 16 and 18 which extend radially outwardly from the periphery of the hollow portion 14.

Indicated at 20 is an auxiliary gear element which is identical with the main drive gear 12 in the outer diameter and the number of gear teeth. The auxiliary gear element 20 has a hub member 22 axially extending from one side of the auxiliary gear element into the circular hollow portion 14 of the main drive gear 12, which hub member 22 is prevented from axial movement by a snap ring 24 and is freely rotatable on the rotatably shaft 10 adjacent the main drive gear 12. The hub member 22 of the auxiliary gear element 20 is formed on its outer periphery with at least two concave portions 26 and 28 facing the respective axially extending guide slots 16 and 18 of the main drive gear 12.

The gearing system also includes at least two weight members 30 and 32 which are located in the hollow portion 14. The weight member 30 has a sliding portion 30a which is slidable within the guide slot 16 and a projection 30b which engage with the concave portion 26 formed on the hub member 22. Likewise, the weight member 32 has a sliding portion 32a which is slidably received in the guide slot 18 and a projection 32b which engages with the concave portion 28 on the hub member 22. Compression spiral springs 34 and 36 are disposed in the guide slots 16 and 18, respectively, for biasing the weight members 30 and 32 radially inwardly to cause the respective projections to engage with the corresponding concave portions on the hub member 22.

It should be noted that, the projections 30b and 32b of the weight members 30 and 32 are held in positions to slightly engage with the corresponding concave portions 26 and 28 as shown in FIG. 2 to cause the gear teeth of the auxiliary gear element to be angularly displaced with respect to those of the main drive gear for thereby eliminating backlash between mating gears when the gear teeth of the auxiliary gear element are aligned with those of the main drive gear 12. Accordingly, when the projections 30b and 32b completely engage with the corresponding concave portions 26 and 28, the gear teeth of the auxiliary gear element 20 is angularly displaced with respect to the gear teeth of the main drive gear 12.

With this construction, when the main drive gear 12 is put in the normal meshing position with the mating gear which is indicated at 38, the gear tooth of the mating gear 38 is held between the gear tooth of the main drive gear 12 and the gear tooth of the auxiliary gear element 20 under a certain pressure so that no backlash can develop between the mating gears. As the rotational speed of the rotatable shaft 10 increases to a predetermined level, the weight members 30 and 32 are moved radially and outwardly by the centrifugal forces exerted thereon against the forces of the compression springs 34 and 36, thereby causing the projections 30b and 32b to disengage from the associated concave portions 26 and 28, respectively. Consequently, the auxiliary gear element 20 is made freely rotatable with respect to the main drive gear 12 so that not only the undesirable power losses can be reduced but also the smooth engagement of the mating gears can be obtained. It may be understood that during low rotational speed of the shaft 10, the backlash can not develop between the mating gears and therefore the objectionable noises can be satisfactorily eliminated.

Figure 3:
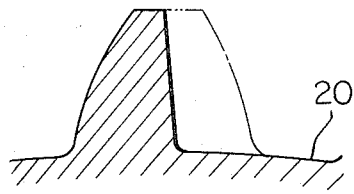
FIG. 3 is a view illustrating an example of gear teeth of the auxiliary gear element shown in FIG. 1.

Whilst, in the illustrated embodiment, the auxiliary gear element 20 is shown and described as rotatably mounted on the rotatable shaft 10, the auxiliary gear element 20 may be directly rotatably mounted on the main drive gear 12 if the auxiliary gear element 20 is angularly displaced to an amount, which is larger than the amount of the backlash, relative to the main drive gear 12. Moreover, although the auxiliary gear element 20 is herein shown as being held in direct contact with the main drive gear 12, this gear element 20 may be slightly spaced from the main drive gear 12. It should also be borne in mind that the gearing system of the present invention is shown as having two guide slots, two compression spiral springs, two weight members and two concave portions, but may include more than two component elements to provide more uniformity in operation. It should further be noted that if the auxiliary gear element 20 is rotatable only in one direction, the gear tooth of the gear element 20 may have the shape shown in FIG. 3.

It will now be appreciated from the foregoing description that according to the present invention, there is no backlash between the mating gear teeths when the rotational shaft is rotating at a speed below a predetermined level whereas, when the rotational speed reaches the predetermined level, the auxiliary gear element becomes freely rotatable with respect to the main drive gear to eliminate power losses due to the frictional resistances of the mating gears and to reduce 8c premature wear of the gears.

While only one embodiment of th present invention has been illustrated and described in detail, it is to be expressly understood that the present invention is not limited thereto. Various modifications and changes may also be made in the design and arrangements of the component parts without departing from the spirit and scope of the present invention as the same will now be understood by those skilled in the art.

What is claimed is:

1. An anti-backlash gearing system comprising; in combination, a main drive gear having at least two radially extending guide slots, an auxiliary gear element which is identical with said main drive gear in outer diameter and the number of gear teeth and which is rotatable with respect to said main drive gear, said auxiliary gear element having a hub member which extends from one side of said auxiliary gear element and which is formed on its outer periphery with at least two concave portions, at least two weight members each having a radially extending sliding portion slidably received in each of said radially extending guide slots of said main drive gear and having a projection engaging with each of said concave portions formed on said hub member, and at least two biasing means each disposed in each of said guide slots of said main drive gear for biasing each of weight members radially inwardly to cause each of said projections of said weight members to engage with each of said concave portions formed on said hub member, said weight members being so disposed that said projections engage with their corresponding concave portions to cause the gear teeth of said auxiliary gear element to be angularly displaced with respect to the teeth of said main drive gear the arrangement being such that when the main drive gear is rotating at a speed below a predetermined level, the tooth of a mating gear is pressed under a certain pressure by the tooth of said main drive gear and the tooth of said auxiliary gear element, as angularly displaced from the tooth of said main drive gear, to eliminate backlash between the mating gears and, when the rotation speed of said main drive gear reaches the predetermined value, said weight members are moved radially outwardly, solely by centrifugal forces acting thereon, against the forces of said biasing means whereby each of said projections formed on said weight members are caused to disengage from each of said concave portions formed on said hub member of said auxiliary gear element to attenuate said pressure and thereby permit the free rotation of said auxiliary gear element with respect to said main drive gear.

2. An anti-backlash gearing system as claimed in claim 1, wherein each of said biasing means includes a compression spiral spring.

3. An anti-backlash gearing system as claimed in claim 1, wherein said main drive gear is integral with a rotatable shaft and wherein said hub member is rotatably disposed on said rotatable shaft.

4. An anti-backlash gearing system as claimed in claim 1, wherein said main drive gear has a circular hollow portion formed at one side thereof, said weight members being located in said circular hollow portion.

* * * * *